United States Patent
Yasunaga et al.

(10) Patent No.: US 11,283,513 B2
(45) Date of Patent: Mar. 22, 2022

(54) TERMINAL DEVICE FOR AIR-TO-GROUND COMMUNICATION, COMMUNICATION CONTROL METHOD THEREFOR, AND AIR-TO-GROUND COMMUNICATION SYSTEM

(71) Applicant: PANASONIC INTELLECTUAL PROPERTY MANAGEMENT CO., LTD., Osaka (JP)

(72) Inventors: Takeshi Yasunaga, Kanagawa (JP); Hideki Kanemoto, Kanagawa (JP); Ritsu Miura, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 77 days.

(21) Appl. No.: 16/753,128

(22) PCT Filed: Sep. 11, 2018

(86) PCT No.: PCT/JP2018/033702
§ 371 (c)(1),
(2) Date: Apr. 2, 2020

(87) PCT Pub. No.: WO2019/069645
PCT Pub. Date: Apr. 11, 2019

(65) Prior Publication Data
US 2020/0295820 A1 Sep. 17, 2020

(30) Foreign Application Priority Data
Oct. 4, 2017 (JP) .............................. JP2017-194225

(51) Int. Cl.
*H04W 4/42* (2018.01)
*H04B 7/185* (2006.01)
(Continued)

(52) U.S. Cl.
CPC .......... *H04B 7/18506* (2013.01); *H04W 4/06* (2013.01); *H04W 4/42* (2018.02);
(Continued)

(58) Field of Classification Search
CPC .... H04B 7/18506; H04W 16/26; H04W 4/06; H04W 4/42; H04W 4/90; H04W 76/34; H04W 76/50; H04W 84/00; H04W 84/06
See application file for complete search history.

(56) References Cited

U.S. PATENT DOCUMENTS

| 6,108,539 | A | 8/2000 | Ray et al. | |
| 2016/0119938 | A1* | 4/2016 | Frerking | H04B 7/1851 370/316 |
| 2018/0376357 | A1* | 12/2018 | Tavares Coutinho | H04L 67/10 |

FOREIGN PATENT DOCUMENTS

JP 2001-522160 11/2001

OTHER PUBLICATIONS

International Search Report (ISR) from International Searching Authority (Japan Patent Office) in International Pat. Appl. No. PCT/JP2018/033702, dated Dec. 4, 2018.

* cited by examiner

*Primary Examiner* — Lester G Kincaid
*Assistant Examiner* — Dung L Lam
(74) *Attorney, Agent, or Firm* — Greenblum & Bernstein, P.L.C.

(57) ABSTRACT

According to the present application, an aircraft terminal device for air-to-ground communication includes an in-flight communication controller configured to control communication with multiple user terminals, and, when a counterpart based station device on the ground needs to reserve a communication resource for ground-to-ground communica-
(Continued)

tion, the in-flight communication controller cuts off communication with at least one of the multiple user terminals.

9 Claims, 6 Drawing Sheets

(51) Int. Cl.
*H04W 4/90* (2018.01)
*H04W 76/50* (2018.01)
*H04W 4/06* (2009.01)
*H04W 16/26* (2009.01)
*H04W 84/06* (2009.01)

(52) U.S. Cl.
CPC ............ *H04W 4/90* (2018.02); *H04W 16/26* (2013.01); *H04W 76/50* (2018.02); *H04W 84/06* (2013.01)

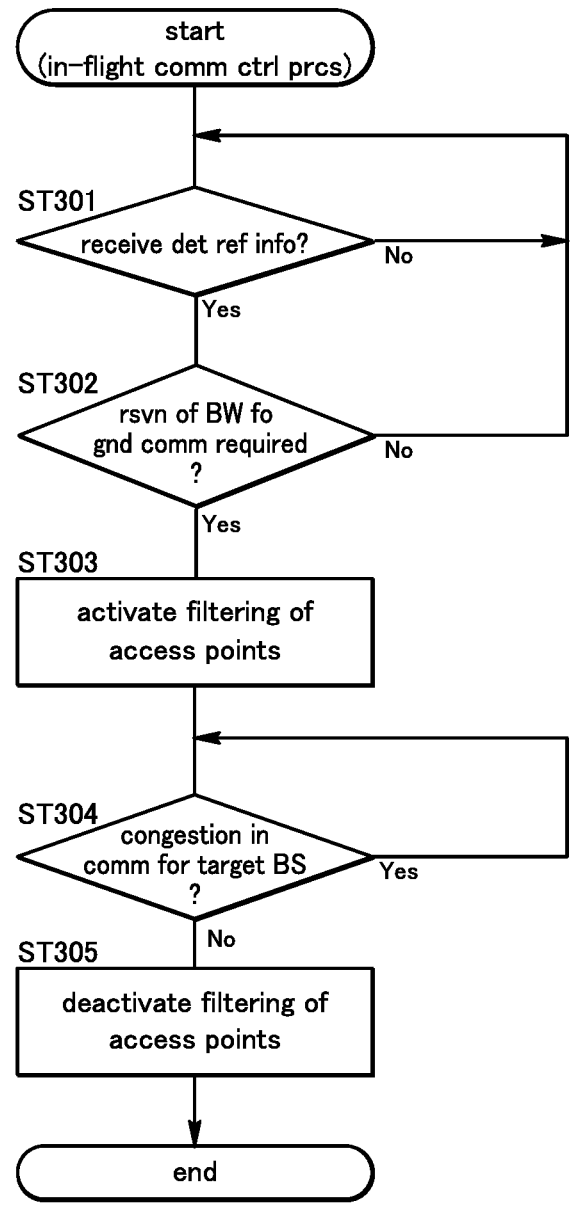

TERMINAL DEVICE FOR AIR-TO-GROUND COMMUNICATION, COMMUNICATION CONTROL METHOD THEREFOR, AND AIR-TO-GROUND COMMUNICATION SYSTEM

TECHNICAL FIELD

The present invention relates to an aircraft terminal device placed in an aircraft (or other flying object) for performing air-to-ground communication with a base station device on a ground location, a communication control method performed by the aircraft terminal device, and an air-to-ground communication system including the aircraft terminal device.

BACKGROUND ART

In recent years, in-flight Internet services have been widely available, which enable user terminals carried by aircraft passengers to be connected to the Internet in an aircraft. Such an in-flight Internet service is realized by, in addition to using a satellite to perform a communication with base stations on the ground, using an air-to-ground communication system in which a terminal for air-to-ground communication placed in an aircraft (aircraft terminal) can perform air-to-ground communications with base stations on the ground.

Since installing a new base station dedicated to air-to-ground communication is costly, an air-to-ground communication system is built by configuring an existing base station for ground-to-ground communication to be also capable of performing air-to-ground communication (for example, by additionally providing a vertically-oriented antenna adapted for air-to-ground communication to such an existing base station for ground-to-ground communication). Known such communication systems include a system in which a cellular wireless communication device for ground-to-ground communication can also operate as a base station for non-ground-to-ground cellular mobile communication; that is, which is capable of performing air-to-ground communication with a communication system in an aircraft or with any other communication system for non-ground-to-ground communication by using at least one of radio frequencies originally assigned for base stations for ground-to-ground wireless cellular mobile communication (See Patent Document 1).

PRIOR ART DOCUMENT(S)

Patent Document(s)

Patent Document 1: JP2001-522160A

SUMMARY OF THE INVENTION

Task to be Accomplished by the Invention

However, when a base station for ground-to-ground communication is also capable of performing air-to-ground communication like the system of the above-described Patent Document 1, the base station needs to perform communication with not only terminal devices on the ground but also a terminal device for air-to-ground communication up in the air (located in an aircraft), and involves a problem that, when the volume of traffic is concentrated to one communication channel to thereby cause congestion in communication, in the case of an emergency event (e.g. a national disaster), such a concentration of traffic can inconveniently restrict a communication resource for ground-to-ground communication to a level which is not sufficient for necessary communication.

The present invention has been made in view of such problems of the prior art, and a primary object of the present invention is to provide an aircraft terminal device for air-to-ground communication, a communication control method performed by the aircraft terminal device and an air-to-ground communication system including the aircraft terminal device, which are used with a base station device for ground-to-ground communication which is also capable of performing air-to-ground communication with a terminal device for air-to-ground communication in an aircraft, and enable the base station device to be used, in the case of an emergency event (e.g. a natural disaster), so as to prevent air-to-ground communication from restricting a communication resource for ground-to-ground communication to a level which is not sufficient for necessary communication.

Means to Accomplish the Task

A first aspect of the present invention provides an aircraft terminal device for performing air-to-ground communication with a base station device used for ground-to-ground communication in order to relay communication between multiple user terminals in an aircraft and a communication device on a ground location, the aircraft terminal device comprising: an in-flight communication controller configured to control communication with the multiple user terminals, wherein the in-flight communication controller controls communication such that, when the in-flight communication controller determines that the base station device needs to reserve an available communication bandwidth for the ground-to-ground communication based on determination reference information from the base station device, the in-flight communication controller cuts off communication with at least one of the multiple user terminals.

Another aspect of the present invention provides a communication system comprising the aircraft terminal device for performing air-to-ground communication and a base station device used for ground-to-ground communication and capable of performing air-to-ground communication with the aircraft terminal device.

Yet another aspect of the present invention provides a communication control method performed by an aircraft terminal device for performing air-to-ground communication with a base station device used for ground-to-ground communication in order to relay communication between multiple user terminals in an aircraft and a communication device on a ground location, the method comprising controlling communication by cutting off communication with at least one of the multiple user terminals when the aircraft terminal device determines that the base station device needs to reserve an available communication bandwidth for the ground-to-ground communication.

Effect of the Invention

According to the present invention, when a base station device for ground-to-ground communication is also capable of air-to-ground communication with a terminal device for air-to-ground communication in an aircraft, the base station device can be used, in the case of an emergency event (e.g. a natural disaster), so as to prevent air-to-ground communication from restricting a communication resource for ground-to-ground communication to a level which is not sufficient for necessary communication.

BRIEF DESCRIPTION OF THE DRAWINGS

FIG. 6 is a flowchart showing an operation procedure of operations performed by an aircraft terminal 2 according to a third embodiment of the present invention.

DESCRIPTION OF THE PREFERRED EMBODIMENT(S)

Figure 1:
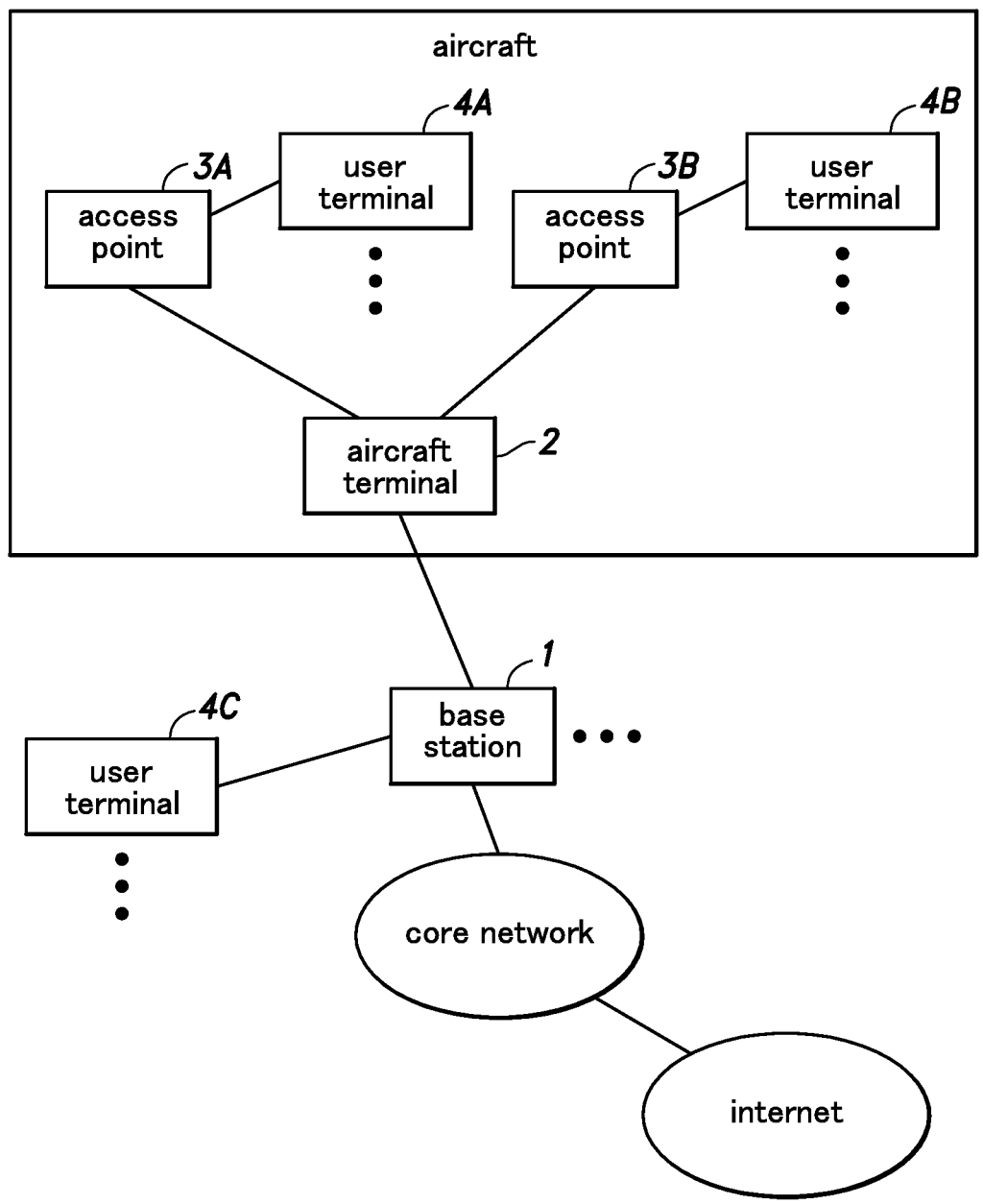
FIG. 1 is a diagram showing a general configuration of a communication system according to a first embodiment of the present invention.

A first aspect of the present invention made to achieve the above-described object is an aircraft terminal device for performing air-to-ground communication with a base station device used for ground-to-ground communication in order to relay communication between multiple user terminals in an aircraft and a communication device on a ground location, the aircraft terminal device comprising: an in-flight communication controller configured to control communication with the multiple user terminals, wherein the in-flight communication controller controls communication such that, when the in-flight communication controller determines that the base station device needs to reserve an available communication bandwidth for the ground-to-ground communication based on determination reference information from the base station device, the in-flight communication controller cuts off communication with at least one of the multiple user terminals.

In this configuration, when an aircraft terminal device in an aircraft is used with a base station device for ground-to-ground communication which is also capable of performing air-to-ground communication with the aircraft terminal device, and determines that the base station device needs to reserve an available communication bandwidth for the ground-to-ground communication, the aircraft terminal device cuts off communication with one or more user terminals placed in an aircraft. As a result, the base station device can be used, in the case of an emergency event (e.g. a natural disaster), so as to prevent air-to-ground communication from restricting a communication resource for ground-to-ground communication to a level which is not sufficient for necessary communication.

A second aspect of the present invention is the aircraft terminal device of the first aspect, wherein the determination reference information is emergency alert information relating to an emergency event which occurs on a ground location.

In this configuration, when an emergency alert is issued on the ground, the aircraft terminal device determines that a base station device needs to reserve an available communication bandwidth for ground-to-ground communication. As a result, it is ensured that the base station device can be used, in the case of an emergency event (e.g. a natural disaster), so as to prevent air-to-ground communication from restricting a communication resource for ground-to-ground communication to a level which is not sufficient for the emergency-event-related communication.

A third aspect of the present invention is the aircraft terminal device of the first aspect, wherein the determination reference information is a number of user terminals to which the base station device can allocate a communication resource for air-to-ground communication.

In this configuration, when the number of user terminals to which a base station device can allocate communication resource for air-to-ground communication is reduced (or becomes small), the aircraft terminal device determines that the base station device needs to reserve an available communication bandwidth for ground-to-ground communication. As a result, it is ensured that the base station device can be used, in the case of an emergency event (e.g. a natural disaster), so as to prevent air-to-ground communication from restricting a communication resource for ground-to-ground communication to a level which is not sufficient for necessary communication.

A fourth aspect of the present invention is the aircraft terminal device of the first aspect, wherein the in-flight communication controller is configured to control communication with each user terminal in the aircraft via one or more repeaters which are configured to relay in-flight communication between the aircraft terminal device and the multiple user terminals, and wherein the in-flight communication controller controls communication such that the in-flight communication controller cuts off communication with at least one of the repeaters in order to cut off communication with the at least one of the multiple user terminals.

In this case, the aircraft terminal device can cut off communication with a group of user terminals (i.e. the user terminals which are connectable to a repeater) by a simple configuration.

A fifth aspect of the present invention is the aircraft terminal device of the fourth aspect, wherein the repeaters include a crew repeater configured to relay communication with cabin crew's user terminals, and wherein the in-flight communication controller cuts off communication with the at least one of the multiple user terminals by cutting off communication with all the repeaters other than the crew repeater.

In this case, the aircraft terminal device can cut off communication with a group of user terminals while reserving communication with cabin crew (that is, still allowing cabin crew to acquire information from a base station device on the ground) by a simple configuration.

A sixth aspect of the present invention is the aircraft terminal device of the first aspect, wherein the in-flight communication controller is configured to control communication with each user terminal in the aircraft via one or more repeaters which are configured to relay in-flight communication between the aircraft terminal device and the multiple user terminals, and wherein the in-flight communication controller cuts off communication with the at least one of the multiple user terminals by prohibiting the at least one of the multiple user terminals from communicating with the one or more repeaters.

In this case, the aircraft terminal device can reserve communication with one or more specific user terminals while cutting off communication with the remaining user terminals.

A seventh aspect of the present invention is the aircraft terminal device of the first aspect, wherein, when the aircraft terminal device performs a handover from the base station device to a new base station device, the in-flight communication controller restarts communication with the user terminals with which the in-flight communication controller has cut off communication.

In this configuration, when the aircraft terminal device performs a handover from a base station device for which the number of communication-permissible user terminals is reduced to a new base station device, the user terminals which have been not allowed to perform communication can restart communication. As a result, this configuration can prevent user terminals' communications from being excessively cut off.

An eighth aspect of the present invention is a communication system comprising the aircraft terminal device of any of the first to the seventh aspects adapted for performing air-to-ground communication and a base station device used for ground-to-ground communication and capable of performing air-to-ground communication with the aircraft terminal device.

In this configuration, when an aircraft terminal device in an aircraft is used with a base station device for ground-to-ground communication which is also capable of performing air-to-ground communication with the aircraft terminal device, and determines that the base station device needs to reserve an available communication bandwidth for the ground-to-ground communication, the aircraft terminal device cuts off communication with one or more user terminals placed in an aircraft. As a result, the base station device can be used, in the case of an emergency event (e.g. a natural disaster), so as to prevent air-to-ground communication from restricting a communication resource for ground-to-ground communication to a level which is not sufficient for necessary communication.

A ninth aspect of the present invention is a communication control method performed by an aircraft terminal device for performing air-to-ground communication with a base station device used for ground-to-ground communication in order to relay communication between multiple user terminals in an aircraft and a communication device on a ground location, the method comprising controlling communication by cutting off communication with at least one of the multiple user terminals when the aircraft terminal device determines that the base station device needs to reserve an available communication bandwidth for the ground-to-ground communication.

In this configuration, when an aircraft terminal device in an aircraft is used with a base station device for ground-to-ground communication which is also capable of performing air-to-ground communication with the aircraft terminal device, and determines that the base station device needs to reserve an available communication bandwidth for the ground-to-ground communication, the aircraft terminal device cuts off communication with the user terminals (or some of the user terminals) placed in the aircraft. As a result, the base station device can be used, in the case of an emergency event (e.g. a natural disaster), so as to prevent air-to-ground communication from restricting a communication resource for ground-to-ground communication to a level which is not sufficient for necessary communication.

Embodiments of the present invention are described in the following with reference to the appended drawings.

First Embodiment

FIG. 1 is a diagram showing a general configuration of a communication system according to a first embodiment of the present invention.

This communication system (air-to-ground communication system) provides in-flight Internet services to aircraft's passengers, and includes a base station 1 (a base station device) on the ground and an aircraft terminal 2 (a terminal device for air-to-ground communication), multiple access points (repeaters) 3A and 3B placed in an aircraft, and multiple user terminals 4A to 4C used by multiple users, respectively.

The base station 1 performs air-to-ground communication with the aircraft terminal 2 placed in the aircraft. The base station 1 also performs ground-to-ground communication with user terminals 4C used on the ground. Wireless communication systems such as LTE (Long Term Evolution) are adopted for air-to-ground communication and ground-to-ground communication. The base station 1 is connected to the Internet via a core network (backbone).

The aircraft terminal 2 performs air-to-ground communication with the base station 1 on the ground. The aircraft terminal 2 is connected to the access points 3A and 3B via a network.

The access points 3A, 3B each communicate with user terminals 4 used in the aircraft by a wireless LAN communication method such as Wi-Fi (Registered trademark). The access points 3A and 3B are provided at different locations in the aircraft (for example, in the front part and the rear part of an aircraft), and can communicate with user terminals 4A and 4B used by users seated near the respective access points.

In the present embodiment, the user terminals 4A and 4B communicate with the respective access points 3A and 3B. In some cases, the user terminals 4A and 4B may be capable of communicating with any access point (in this case, any of the access points 3A and 3B). The number and locations of the access points 3A and 3B may be changed as appropriate. In the following description, the access points 3A and 3B are collectively referred to as "access points 3" unless it is necessary to describe the two access points in a distinguished manner.

The user terminals 4A to 4C each may be a smartphone, a tablet terminal, and any other suitable terminal device. In the aircraft, the user terminals 4 connect to the access points 3A, 3B, respectively, and transmit and receive user data to and from a counterpart station such as a distribution server connected to the Internet via the access points 3A, 3B, the aircraft terminal 2, the base station 1, and the core network. On the ground, a user terminal 4C connects to the base station 1 and transmits and receives user data to and from a counterpart station such as a distribution server on the Internet via the base station 1 and the core network.

For convenience of description herein, the user terminals 4A and 4B placed in the aircraft are distinguished from the user terminal 4C on the ground in the description. However, when the users of the user terminals 4A and 4B get off the aircraft, the user terminals 4A and 4B can perform ground-to-ground communication in the same manner as the user terminal 4C. Also, when the user of the user terminal 4C gets on an aircraft, the user terminal 4C can perform communication in the aircraft in the same manner as the user terminals 4A and 4B. The number and locations of the user terminals 4A to 4C may be changed as appropriate. In the following description, the user terminals 4A to 4C are collectively referred to as "user terminals 4" unless it is necessary to describe the user terminals in a distinguished manner.

Air-to-ground communication between the base station 1 and the aircraft terminal 2 is controlled by following the same control procedure as ground-to-ground communication between the base station 1 and the user terminal 4C on the ground, where the control procedure is common to all cellular communication methods such as LTE.

In the base station 1, the frequencies used for air-to-ground communication and ground-to-ground communication are not limited to particular frequency bands. However, since the user terminal 4C generally performs cellular communications by using a UHF band, when the base station 1 performs air-to-ground communication and ground-to-ground communication by using a VHF band, the user terminal 4C cannot directly communicate with the base station 1. In this case, a repeater device (such as a wireless LAN access point) may be provided for supporting communication using a VHF band so that the user terminals 4 can communicate with the base station 1 via the repeater device.

Figure 2:
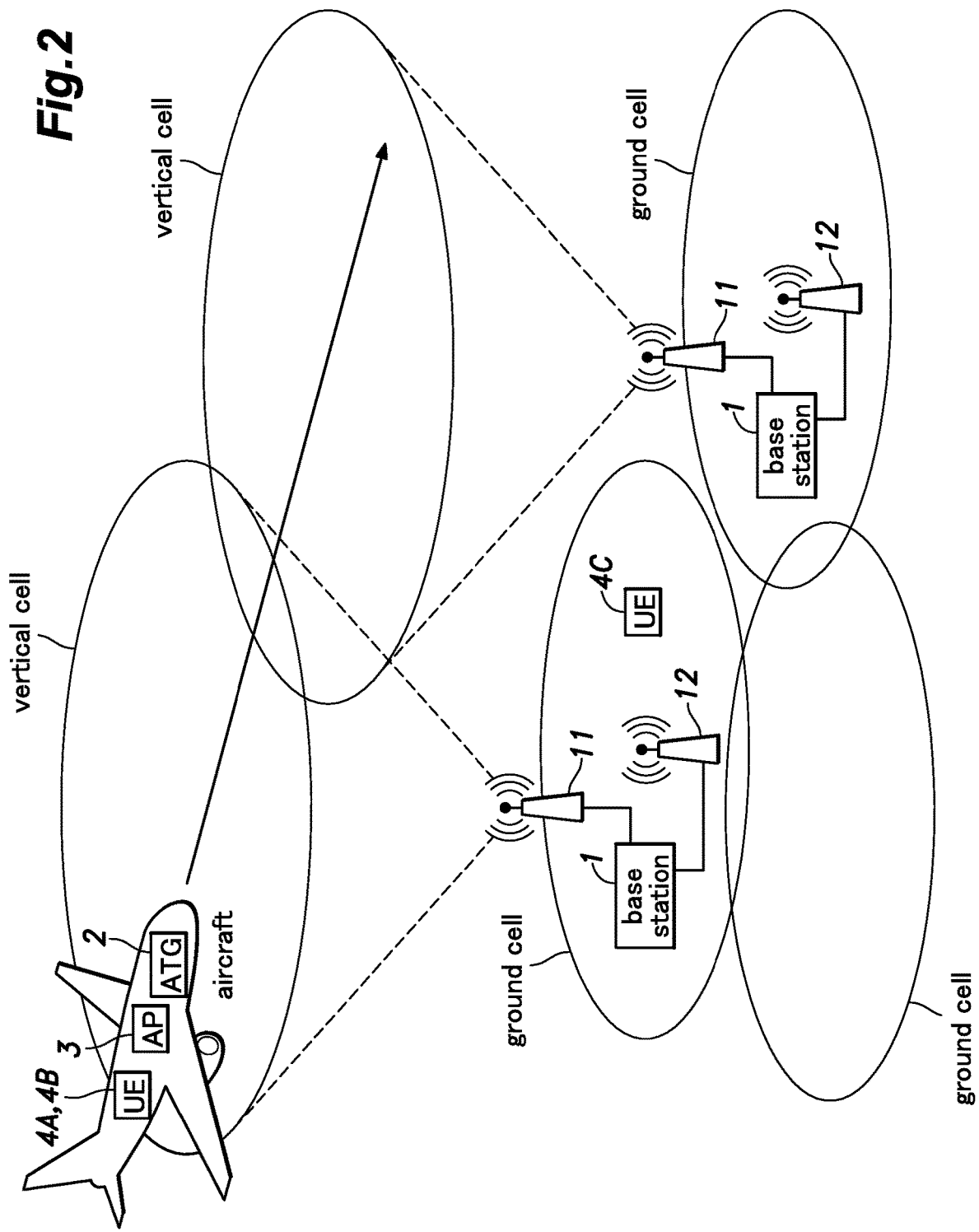
FIG. 2 is an explanatory view showing an outline of the communication system according to the first embodiment of the present invention.

Next, an outline of the communication system according to the first embodiment of the present invention will be described. FIG. 2 is an explanatory view showing an outline of the communication system.

The base station 1 has a vertically-oriented antenna 11 adapted for air-to-ground communication, and a horizontally-oriented antenna adapted for ground-to-ground communication. The vertically-oriented antenna 11 forms a vertically-oriented cell (also simply referred to as "vertical cell") for air-to-ground communication and the horizontally-oriented antenna 12 forms a ground cell for ground-to-ground communication. The aircraft terminal 2 placed in the aircraft connects to the vertical cell, and the user terminal 4C used on the ground connects to the ground cell.

Multiple base stations 1 are placed on the ground at necessary intervals. As the aircraft moves, the aircraft terminal 2 placed in the aircraft performs a handover; that is, switches its connection destination form one vertical cell (base station) to another. There are also ground base stations (not shown) equipped with only horizontally-oriented antennas and adapted only for ground-to-ground communication. Such a ground base station forms only a ground cell, and as the user terminal 4C on the ground moves, the user terminal 4C performs a handover; that is, switches its connection destination form one ground cell (base station) to another.

When an emergency event (e.g. a natural disaster) occurs, the base station 1 needs to communicate emergency-event-related information such as emergency alert information. In this case, the volume of communication performed by the user terminal 4C on the ground is increased quickly during a short period of time because of transmission of large amounts of rescue request, collection of disaster information, and safety confirmation. As a result, the base station may become unable to reserve a necessary communication bandwidth (the number of user terminals to which the base station can allocate a communication resource) for ground-to-ground communication.

In view of this problem, in the communication system according to the present invention is configured such that, when the base station 1 needs to reserve an certain available communication bandwidth for ground-to-ground communication, the aircraft terminal 2 performs in-flight communication control operations to control communication in the aircraft so that the base station 1 prioritizes ground-to-ground communication compared to air-to-ground communication (that is, communication with user terminals 4A and 4B in the aircraft).

Figure 3:
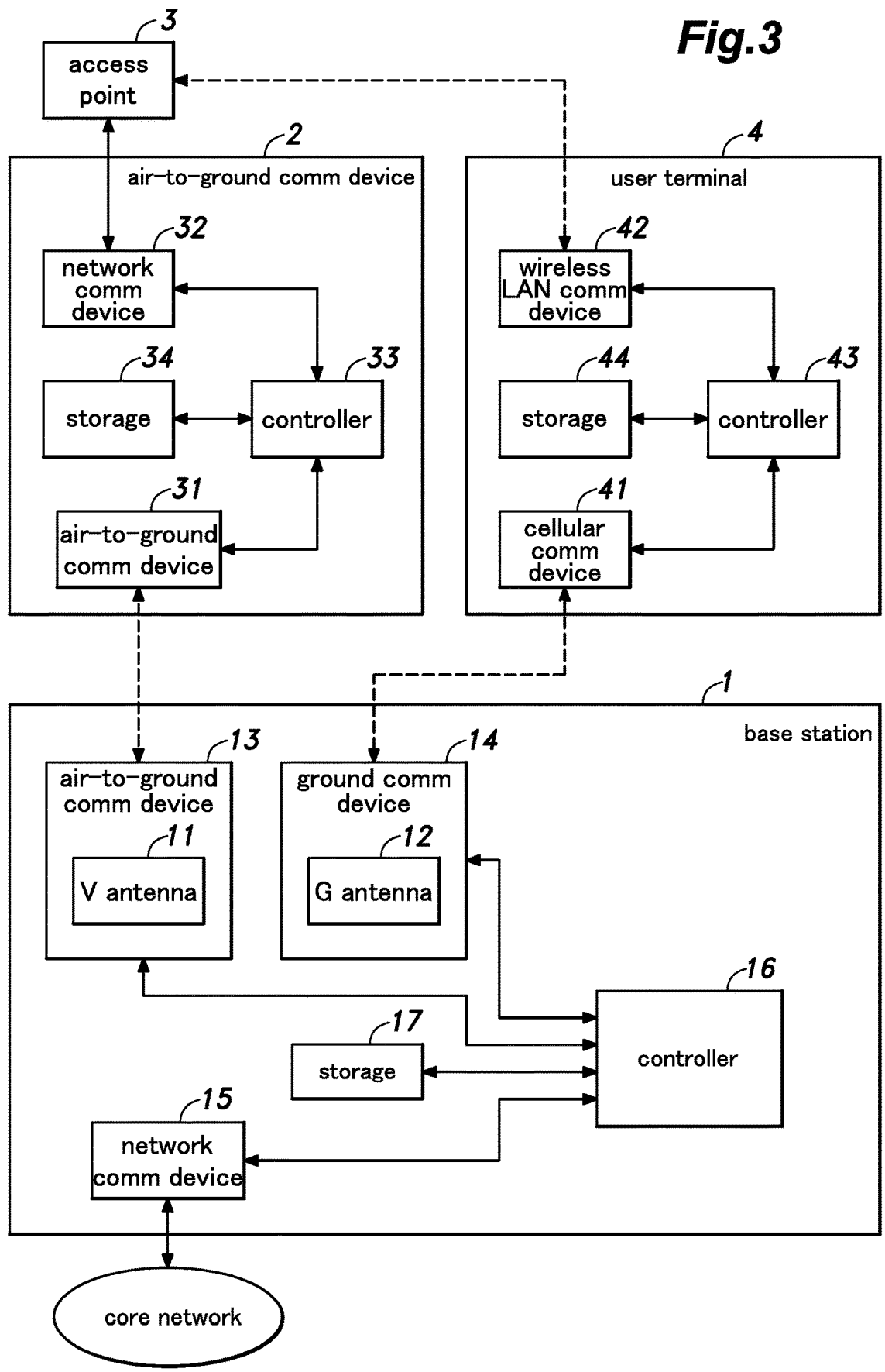
FIG. 3 is a block diagram showing schematic configurations of a base station 1, an aircraft terminal 2 (a terminal for air-to-ground communication), and a user terminal 4 according to the first embodiment of the present invention.

Next, schematic configurations of a base station 1, an aircraft terminal 2, and a user terminal 4 according to the first embodiment will be described. FIG. 3 is a block diagram showing schematic configurations of a base station 1, an aircraft terminal 2, and a user terminal 4.

The aircraft terminal 2 includes an air-to-ground communication device 31, a network communication device 32, a controller 33, and a storage 34.

The air-to-ground communication device 31 communicates with the base station 1 by a wireless communication method such as LTE.

The network communication device 32 communicates with one or more access points 3 connected to the network.

The storage 34 stores a terminal ID of each aircraft terminal 2, programs to be executed by one or more processors to implement the controller 33, and other information. A terminal ID is a user ID stored in a SIM card (Subscriber Identity Module Card). More specifically, a terminal ID is an IMSI (International Mobile Subscriber Identity).

The controller 33 is implemented by one or more processors, and causes the processors to execute programs stored in the storage 34 in order to perform a cell search operation for searching for one or more cells connectable to the aircraft terminal, a cell connection operation for connecting to the cell to which the base station has instructed to connect, or other operations. Moreover, the controller 33 controls connections to the access points 3 to which the network communication device 32 is connected (In this case, the controller determines to connect to the access point for communication or cut off communication with the access point.)

The user terminal 4 includes a cellular communication device 41, a wireless LAN communication device 42, a controller 43, and a storage 44.

The cellular communication device 41 is configured such that, when the user terminal 4 is located on the ground, the cellular communication device 41 communicates with the base station 1 by using a wireless communication method such as LTE.

The wireless LAN communication device 42 is configured such that, when the user terminal 4 is placed in an aircraft, the wireless LAN communication device 42 communicates with the access points 3 by using a wireless LAN communication method.

The storage 44 stores a terminal ID of each user terminal 4, programs to be executed by one or more processors, which implement the controller 43, and other information. It should be noted that each terminal ID is a user ID (IMSI) stored in the SIM card.

The controller 43 is implemented by one or more processors, and causes the processors to execute programs stored in the storage 44 in order to perform a cell search operation for searching for one or more cells connectable to the user terminal, a cell connection operation for connecting to the cell to which the base station has instructed to connect, or other operations.

The base station 1 includes an air-to-ground communication device 13, a ground communication device 14, a network communication device 15, a controller 16, and a storage 17.

The air-to-ground communication device 13 includes a vertically-oriented antenna 11 adapted for air-to-ground communication, and is configured to communicate with the aircraft terminal 2 by using a wireless communication method such as LTE.

The ground communication device 14 includes a horizontally-oriented antenna 12 adapted for ground-to-ground communication, and is configured to communicate with user terminals 4 by using a wireless communication method such as LTE.

The storage 17 stores terminal management information relating to terminal IDs of aircraft terminals 2, cell management information relating to cell IDs of vertical cells and ground cells, and programs to be executed by one or more processors, which implement the controller 16. The terminal management information is used by the controller 16 to identify the aircraft terminals 2.

The controller 16 is implemented by one or more processors, and configured to control processing operations relating to ground-to-ground communication and air-to-ground communication by executing programs stored in the storage 17, where the processing operations include selection operation for selecting a vertical cell or ground cell to which a user terminal 4 is to connect.

Figure 4:
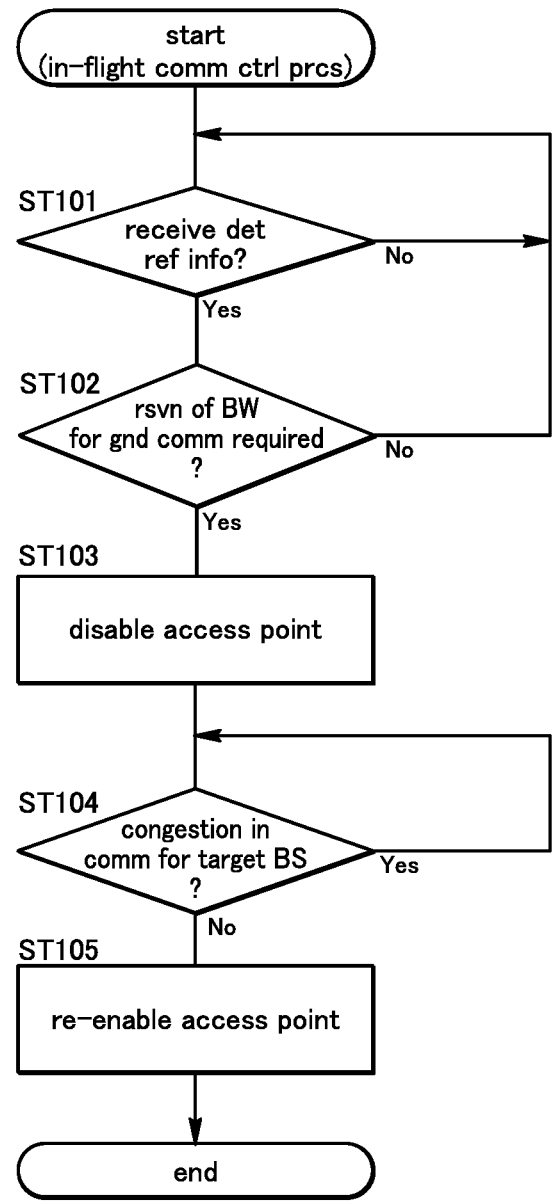
FIG. 4 is a flowchart showing an operation procedure of operations performed by an aircraft terminal 2 according to the first embodiment of the present invention.

Next, an operation procedure of in-flight communication control operations performed by an aircraft terminal 2 according to the first embodiment of the present invention. FIG. 4 is a flowchart showing an operation procedure of the in-flight communication control operations performed by an aircraft terminal 2.

In the in-flight communication control operations, first, when the aircraft terminal 2 receive determination reference information from a base station 1 (Yes in ST101), the aircraft terminal 2 determines whether or not the base station 1 needs to reserve an available communication bandwidth for ground-to-ground communication (ST102). Examples of determination reference information include emergency alert information relating to an emergency event which occurs on the ground (such as the earthquake early warning, or emergency alert information from the national early warning system). Based on such determination reference information from the base station 1, the communication system can accurately determine the necessity for the base station 1 to reserve an available communication bandwidth for ground-to-ground communication.

In the step ST102, if the aircraft terminal 2 determines that the base station needs to reserve an available communication bandwidth for ground-to-ground communication (Yes in ST102), the aircraft terminal 2 disables all the access points 3 (causes the access points to cut off communication with user terminals 4) (ST103). In the case where emergency alert information is used as the determination reference information, when receiving emergency alert information from the base station 1, the aircraft terminal 2 determines the base station 1 needs to reserve an available communication bandwidth for ground-to-ground communication.

Thereafter, the aircraft terminal 2 determines whether or not congestion occurs in communication performed by the base station 1 (ST104), and if it is determined that congestion does not occur in communication (or congestion has been eliminated) (No), the aircraft terminal 2 restarts communication with (connects communication to) the access points 3 which, in ST103, have been disabled (ST105). For example, when a handover is performed from the current base station 1 to another base station 1, the aircraft terminal 2 can determine that congestion does not occur in communication performed by the base station 1.

The determination reference information received from the base station 1 in ST101 may be the number of user terminals to which the base station 1 can allocate a communication resource for air-to-ground communication (control information on resource allocation transmitted from a base station 1 to the aircraft terminal 2). In the case where information on resource allocation for air-to-ground communication is used as the determination reference information, when the aircraft terminal determines in ST102 that the amount of a communication resource allocated to air-to-ground communication by the base station 1 is equal to or less than a predetermined threshold (or that the amount of a newly allocated communication resource is smaller than the previous (current) amount of a communication resource), the aircraft terminal 2 can determine that the base station 1 needs to reserve an available communication bandwidth for ground-to-ground communication.

In other embodiments, the determination reference information received from the base station 1 may be an instruction (control signal) relating to the cutting-off (or stop) of in-flight communication transmitted from the base station 1 to the aircraft terminal 2.

As described above, in the communication system, when the aircraft terminal determines that the base station 1 needs to reserve an available communication bandwidth for ground-to-ground communication, the aircraft terminal cuts off communication with the user terminals 4 (or some of the user terminals) in the aircraft. As a result, the base station 1 can be used, in the case of an emergency event (e.g. a natural disaster), so as to prevent air-to-ground communication from restricting a communication resource for ground-to-ground communication to a level which is not sufficient for necessary communication. In some embodiment, when an emergency alert is issued, the aircraft terminal determines that the base station needs to reserve an available communication bandwidth for ground-to-ground communication. As a result, it is ensured that the base station can be used, in the case of an emergency event, so as to prevent air-to-ground communication from restricting a communication resource for ground-to-ground communication to a level which is not sufficient for necessary communication. In other embodiments, when the number of user terminals to which the base station can allocate a communication resource for air-to-ground communication is reduced (small), the aircraft terminal determines that the amount of an available communication resource for ground-to-ground communication is decreased and thus the base station needs to reserve an available communication bandwidth for ground-to-ground communication. As a result, it is ensured that the base station can be used so as to prevent air-to-ground communication from restricting a communication resource for ground-to-ground communication to a level which is not sufficient for necessary communication.

Since the aircraft terminal 2 controls communication with user terminals 4 via one or more of the access points 3 configured to relay in-flight communication from the user terminals 4, the aircraft terminal can cut off communication with a group of user terminals (i.e. the user terminals which connect to the access points) by a simple configuration. As a result, air-to-ground communication can be reduced in order for the base station to reserve a communication resource for ground-to-ground communication (that is, reserve the required number of user terminals on the ground to which the base station can allocate a communication resource).

Furthermore, the aircraft terminal 2 may be configured such that, when the aircraft terminal performs a handover by switching the base station 1 to a new base station device, the aircraft terminal determines that the aircraft terminal 2 has passed through a communication coverage area of the base station with a congested communication channel, and then restarts communication with the user terminals 4, thereby preventing the user terminals' communications from being excessively cut off.

Second Embodiment

Figure 5:
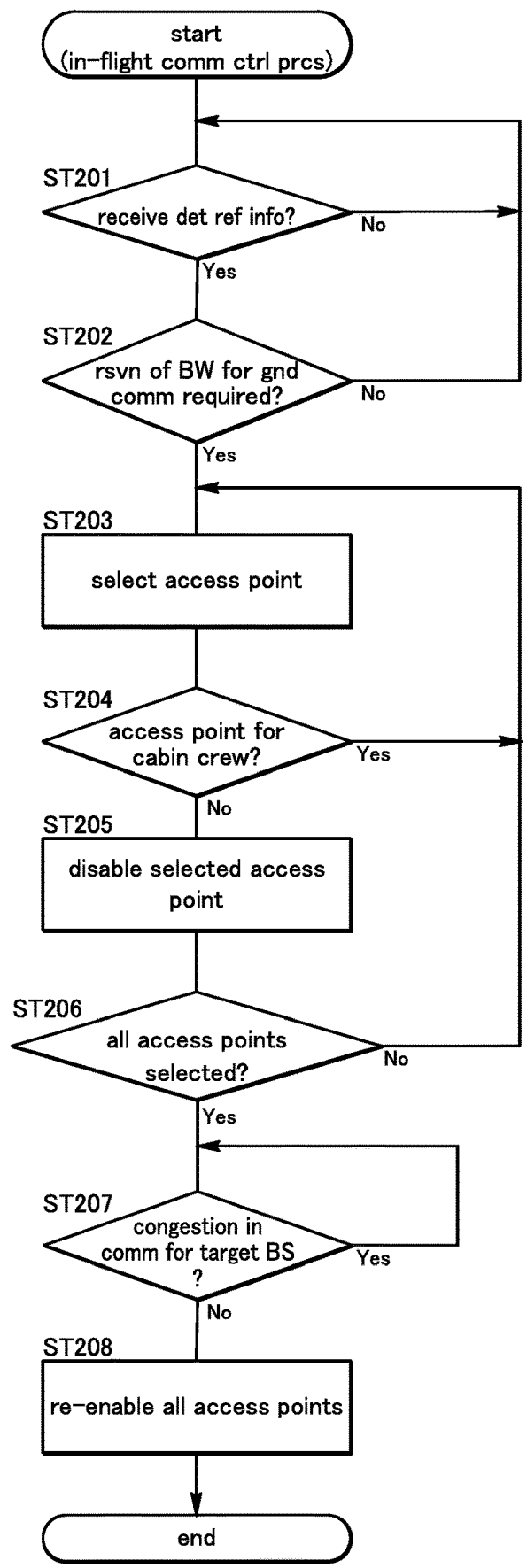
FIG. 5 is a flowchart showing an operation procedure of operations performed by an aircraft terminal 2 according to a second embodiment of the present invention.

FIG. 5 is a flowchart showing an operation procedure of operations performed by an aircraft terminal 2 in a communication system according to a second embodiment of the present invention. The operation procedure in FIG. 5 is to be compared to that shown in FIG. 4. Except for what will be discussed here, the communication system of the second embodiment is the same as that of the first embodiment described above with reference to FIGS. 1 to 4.

In the second embodiment, at least one of multiple access points placed in an aircraft is used as a device which can be used only by cabin crew (or specific persons other than ordinary passengers) in the aircraft. In the example of communication system shown in FIG. 1, the access point 3A may be a device for aircraft cabin crew, and configured to relay only communication performed by the cabin crew's user terminal 4A (while rejecting access from the passenger's user terminal 4A). The communication system may be configured such that the access point 3B is used as a device for aircraft's passengers, and configured to relay communication from the passenger's user terminal 4B. In other embodiments, the access point 3B may be configured to be used by not only the passenger's user terminal 4B but also the cabin crew's user terminal 4A.

In the operation procedure according to the second embodiment, first, the aircraft terminal 2 performs the operations in steps ST201 and ST202, which are same as the steps ST101 and ST102 in FIG. 4, respectively.

In the step ST202, when the aircraft terminal 2, based on determination reference information from the base station 1, determines that the base station 1 needs to reserve an available communication bandwidth for ground-to-ground communication (Yes), the aircraft terminal 2 selects one of the multiple access points to be checked (ST203). If the selected access point is not a device for cabin crew (No in ST204), the aircraft terminal 2 disables the selected access point (that is, causes the selected access point to cut off communication) (ST205). If the access point selected in ST203 is a device for cabin crew (Yes in ST204), the process returns to the step ST203, in which the aircraft terminal selects one of the remaining access points.

Thereafter, the aircraft terminal 2 determines whether or not all the access points have been selected (ST206), and if the selection is completed (Yes), the aircraft terminal 2 performs the operations in steps ST207 and ST208, which are same as the steps ST104 and ST105 in FIG. 4, respectively.

As described above, in the communication system according to the second embodiment, the aircraft terminal can cut off communication with a group of the user terminals 4 while reserving communication with the cabin crew's user terminals (that is, still allowing cabin crew to acquire information from base stations on the ground) by a simple configuration. As a result, air-to-ground communication can be reduced in order for the base station to reserve a communication resource for ground-to-ground communication (that is, reserve the required number of user terminals to which the base station can allocate a communication resource).

In the second embodiment, the aircraft terminal is configured to disable all the access points other than the cabin crew's access points. However, the aircraft terminal may be configured to disable not all but some of the access points other than the cabin crew's access points.

Third Embodiment

FIG. 6 is a flowchart showing an operation procedure of operations performed by an aircraft terminal 2 in a communication system according to a third embodiment of the present invention. The operation procedure in FIG. 6 is to be compared to those shown in FIGS. 4 and 5. Except for what will be discussed here, the communication system of the third embodiment is the same as that of the first embodiment described above with reference to FIGS. 1 to 4.

In the third embodiment, access points 3 placed in an aircraft have a filtering function, which only permits communication performed by specific user terminals 4. In the operation procedure, first, the aircraft terminal 2 performs the operations in steps ST301 and ST302, which are same as the steps ST101 and ST102 in FIG. 4, respectively.

In the step ST302, when the aircraft terminal 2, based on determination reference information from the base station 1, determines that the base station 1 needs to reserve an available communication bandwidth for ground-to-ground communication (Yes), the aircraft terminal 2 activates a preset filtering function to filter each access point to be rejected (ST303). For example, the aircraft terminal 2 stores MAC addresses of user terminals used by cabin crew (or specific persons other than ordinary passengers) in the aircraft and stored therein beforehand, and, when determining that the base station 1 needs to reserve an available communication bandwidth for ground-to-ground communication (Yes in ST302), the aircraft terminal 2 activates the preset filtering function of each access point 3 to filter user terminals 4 whose MAC addresses are not those of cabin crew's user terminals stored therein, while permitting communication performed by the cabin crew's user terminals with the stored MAC addresses.

Thereafter, the aircraft terminal 2 performs the operations in steps ST304 and ST305, which are same as the steps ST104 and ST105 in FIG. 4, respectively. In step ST305, the aircraft terminal 2 deactivates the preset filtering function to permit communications performed by all the user terminals 4.

As described above, in the communication system according to the third embodiment, by utilizing a filtering function of each access point, the aircraft terminal 2 can cut off communication with user terminals 4 used by users who are not cabin crew while reserving communication with the cabin crew's user terminals, irrespective of locations (communication coverage areas) of the access points. As a result, air-to-ground communication can be reduced in order for the base station to reserve a communication resource for ground-to-ground communication (that is, reserve the required number of user terminals to which the base station can allocate a communication resource).

In the third embodiment, the aircraft terminal is configured to allow only the cabin crew's user terminal to perform communication. However, the aircraft terminal may be configured to selectively allow user terminals used by a specific passenger or a passenger in a specific seat to perform communication.

In the above-described embodiments, an aircraft terminal 2 and access points 3 are placed in an aircraft. However, an aircraft terminal and access points may be placed in other flying object such as a helicopter.

While specific embodiments of the present invention are described herein for illustrative purposes, the present invention is not limited to those specific embodiments. It will be understood that various changes, substitutions, additions, and omissions may be made for elements of the embodiments without departing from the scope of the invention. In addition, elements and features of the different embodiments may be combined with each other as appropriate to yield a new embodiment which is within the scope of the present invention.

INDUSTRIAL APPLICABILITY

An aircraft terminal device for air-to-ground communication, a communication control method therefor, and an air-to-ground communication system according to the present invention are used with a base station device for ground-to-ground communication which is also capable of performing air-to-ground communication with a terminal device for air-to-ground communication in an aircraft, and enable the base station to be used, in the case of an emergency event (e.g. a natural disaster), so as to prevent air-to-ground communication from restricting a communication resource for ground-to-ground communication to a level which is not sufficient for necessary communication, and are useful as an aircraft terminal device placed in an aircraft and adapted for air-to-ground communication with a base station device on the ground, a communication control method performed by the aircraft terminal device, and an air-to-ground communication system including the aircraft terminal device.

Glossary 1 base station
2 aircraft terminal
3A, 3B access points
4A, 4B, 4C user terminals
11 vertically-oriented antenna
12 horizontally-oriented antenna
13 air-to-ground communication device
14 ground communication device
15 network communication device
16 controller
17 storage
31 air-to-ground communication device
32 network communication device
33 controller (in-f in-flight communication controller)
34 storage
41 cellular communication device 41
42 wireless LAN communication device 42
43 controller
44 storage

The invention claimed is:

1. A communication system, comprising:
a base station device; and
an aircraft terminal device configured to be placed in an aircraft, the aircraft terminal device comprising:
an air-to-ground communication device configured to perform air-to-ground communication with the base station in order to relay communications from multiple first user terminals, the multiple first user terminals being used in the aircraft; and
an in-flight communication controller configured to control communication with the multiple first user terminals used in the aircraft, wherein the base station device is configured to perform the air-to-ground communication with the air-to-ground communication device and to also perform ground-to-ground communication with multiple second user terminals, the multiple second user terminals being used on the ground, and
the in-flight communication controller is configured to control the communication with the multiple first user terminals such that, in response to the in-flight communication controller determining that the base station device needs to reserve an available communication bandwidth for the ground-to-ground communication between the base station device and the multiple second user terminals used on the ground based on a receipt of determination reference information from the base station device, the in-flight communication controller cuts off communication between the air-to-ground communication device and at least one of the multiple first user terminals used in the aircraft.

2. The aircraft terminal device according to claim 1, wherein the determination reference information is emergency alert information relating to an emergency event which occurs on a ground location.

3. The aircraft terminal device according to claim 1, wherein the determination reference information is a number of user terminals to which the base station device is configured to allocate a communication resource for air-to-ground communication.

4. The aircraft terminal device according to claim 1, wherein the in-flight communication controller is configured to control the communication with the multiple first user terminals used in the aircraft via one or more repeaters, the one or more repeaters being configured to relay in-flight communication between the air-to-ground communication device and the multiple first user terminals, and
wherein the in-flight communication controller controls the communication such that the in-flight communication controller cuts off communication with at least one of the one or more repeaters in order to cut off the communication between the air-to-ground communication device and the at least one of the multiple first user terminals used in the aircraft.

5. The aircraft terminal device according to claim 4, wherein the one or more repeaters includes plural repeaters, the plural repeaters including a crew repeater configured to relay communication with user terminals of a cabin crew, and
wherein the in-flight communication controller cuts off communication between the air-to-ground communication device and the at least one of the multiple first user terminals by cutting off communication with all of the plural repeaters other than the crew repeater.

6. The aircraft terminal device according to claim 1, wherein the in-flight communication controller is configured to control the communication with the multiple first user terminals used in the aircraft via one or more repeaters, the one or more repeaters being configured to relay in-flight communication between the air-to-ground communication device and the multiple first user terminals, and
wherein the in-flight communication controller cuts off the communication between the air-to-ground communication device and the at least one of the multiple first user terminals by prohibiting the at least one of the multiple first user terminals from communicating with the one or more repeaters.

7. The aircraft terminal device according to claim 1, wherein, when the aircraft terminal device performs a handover from the base station device to a new base station device, the in-flight communication controller restarts the communication between the air-to-ground communication device and the at least one of the multiple first user terminals with which the in-flight communication controller has cut off communication.

8. An air-to-ground communication system, comprising:
an aircraft terminal device; and
a base station device,
wherein the aircraft terminal device comprises:
an air-to-ground communication device configured to perform air-to-ground communication with the base station in order to relay communications from multiple first user terminals, the multiple first user terminals being used in the aircraft;
an in-flight communication controller configured to control communication with the multiple first user terminals used in the aircraft,
wherein the base station device is configured to perform the air-to-ground communication with the air-to-ground communication device and to also perform ground-to-ground communication with multiple second user terminals, the multiple second user terminals being used on the ground, and
the in-flight communication controller is configured to control the communication with the multiple first user terminals such that, in response to the in-flight communication controller determining that the base station device needs to reserve an available communication bandwidth for the ground-to-ground communication between the base station device and the multiple second user terminals used on the ground based on a receipt of determination reference information from the base station device, the in-flight communication controller cuts off communication between the air-to-ground communication device and at least one of the multiple first user terminals used in the aircraft.

9. A communication control method performed by an aircraft terminal device and a base station device, the communication control method comprising:
performing, by an air-to-ground communication device, air-to-ground communication with the base station device in order to relay communications from multiple first user terminals, the multiple first user terminals being used in the aircraft; and
controlling, by an in-flight communication controller, communication with the multiple first user terminals used in the aircraft,
wherein the base station device is configured to perform the air-to-ground communication with the air-to-ground communication device and to also perform ground-to-ground communication with multiple second user terminals, the multiple second user terminals being used on the ground, and
in the controlling, the in-flight communication controller controls the communication with the multiple first user terminals such that, in response to the in-flight communication controller determining that the base station device needs to reserve an available communication bandwidth for the ground-to-ground communication between the base station device and the multiple second user terminals used on the ground based on a receipt of determination reference information from the base station device, cutting off communication between the air-to-ground communication device and at least one of the multiple first user terminals used in the aircraft.

* * * * *